(12) United States Patent
Koyatsu et al.

(10) Patent No.: US 8,559,080 B2
(45) Date of Patent: Oct. 15, 2013

(54) IMAGE FORMING APPARATUS AND COMPUTER READABLE MEDIUM FOR IMAGE FORMING

(75) Inventors: Jun Koyatsu, Saitama (JP); Noribumi Sato, Saitama (JP); Mitsuru Iioka, Saitama (JP); Kaoru Yamauchi, Saitama (JP); Takaya Nagasaki, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 439 days.

(21) Appl. No.: 12/536,933

(22) Filed: Aug. 6, 2009

(65) Prior Publication Data

US 2010/0073743 A1  Mar. 25, 2010

(30) Foreign Application Priority Data

Sep. 24, 2008  (JP) .................................. 2008-244509

(51) Int. Cl.
| H04N 1/405 | (2006.01) |
| H04N 1/60 | (2006.01) |
| H04N 1/56 | (2006.01) |
| H04N 1/54 | (2006.01) |
| H04N 1/52 | (2006.01) |
| H04N 1/50 | (2006.01) |
| G06K 15/02 | (2006.01) |
| G03F 3/10 | (2006.01) |
| G09G 5/06 | (2006.01) |

(52) U.S. Cl.
USPC .............. 358/518; 358/1.2; 358/1.9; 358/2.1; 358/3.11; 358/3.12; 358/1.16; 358/1.18; 358/501; 358/538; 358/540; 382/162; 382/164; 382/165; 382/167; 382/171; 645/600; 645/601; 645/602; 645/603; 645/604

(58) Field of Classification Search
None
See application file for complete search history.

(56) References Cited

U.S. PATENT DOCUMENTS

| 5,946,412 | A  | * | 8/1999 | Nishikawa ..................... 382/162 |
| 6,400,467 | B1 | * | 6/2002 | Harrington ..................... 358/1.9 |
| 6,441,913 | B1 | * | 8/2002 | Anabuki et al. .............. 358/1.12 |
| 6,600,832 | B1 | * | 7/2003 | Nakayama et al. ........... 382/162 |
| 6,868,183 | B1 | * | 3/2005 | Kodaira et al. ................ 382/203 |
| 6,882,447 | B1 | * | 4/2005 | Nakajima et al. .............. 358/1.9 |
| 7,379,212 | B2 | * | 5/2008 | Nagao ............................ 358/3.2 |

(Continued)

FOREIGN PATENT DOCUMENTS

| JP | A-11-306334 | 11/1999 |
| JP | A-2002-281332 | 9/2002 |
| JP | A-2003-186277 | 7/2003 |
| JP | A-2007-274205 | 10/2007 |

OTHER PUBLICATIONS

Sep. 7, 2010 Office Action issued in Japanese Application No. 2008-244509 (with Translation).

*Primary Examiner* — King Poon
*Assistant Examiner* — Beniyam Menberu
(74) *Attorney, Agent, or Firm* — Oliff & Berridge, PLC

(57) ABSTRACT

An image forming apparatus includes a classifying unit which classifies constituent elements constituting print data into a single or a plurality of areas based on a plurality of types of the constituent elements; a color conversion processing unit which performs, with respect to each of the constituent elements classified by the classifying unit, a color conversion coping with each type the constituent elements; and an image forming unit which composes the constituent elements subjected to the color conversion by the color conversion processing unit and forms an image based on the print data composed.

9 Claims, 8 Drawing Sheets

(56) References Cited

U.S. PATENT DOCUMENTS

| | | |
|---|---|---|
| 7,636,176 B2 * | 12/2009 | Mikami .................... 358/1.9 |
| 7,706,022 B2 * | 4/2010 | Okuyama ................. 358/2.1 |
| 2003/0043392 A1 * | 3/2003 | Sugimoto ................. 358/1.9 |
| 2004/0109181 A1 * | 6/2004 | Suzuki ..................... 358/1.9 |
| 2004/0169889 A1 * | 9/2004 | Sawada .................... 358/2.1 |
| 2004/0223174 A1 * | 11/2004 | Mikami .................... 358/1.9 |
| 2005/0201624 A1 * | 9/2005 | Hara et al. ................ 382/232 |
| 2006/0072134 A1 * | 4/2006 | Umezawa et al. ........ 358/1.9 |
| 2008/0062480 A1 * | 3/2008 | Iizuka et al. ............. 358/518 |
| 2008/0204774 A1 * | 8/2008 | Matsushima ............. 358/1.9 |
| 2009/0109454 A1 * | 4/2009 | Nagarajan et al. ........ 358/1.9 |

* cited by examiner

IMAGE FORMING APPARATUS AND COMPUTER READABLE MEDIUM FOR IMAGE FORMING

CROSS-REFERENCE TO RELATED APPLICATION

This application is based on and claims priority under 35 USC 119 from Japanese Patent Application No. 2008-244509 filed Sep. 24, 2008.

BACKGROUND

1. Technical Field

The present invention relates to an image forming apparatus and an image forming program.

2. Related Art

In an electrophotographic printer for printing out print data, in the case of performing a full color printing etc. by using the three primary colors CMY (C: cyan, M: magenta, Y: yellow), it is possible to use a color called process black which is formed by mixing all the three primary colors to thereby reduce the brightness.

The process black is used when the black toner (K: black) is not installed in a development machine, when the black toner is run out, or when black is used for a particular usage such as a digital water mark and so the full color printing is performed by other three primary colors CMY.

That is, the process black is used in the case of printing image data, which can be drawn by the black toner, by superimposing three colors. In the case of printing image data on a print medium such as a print sheet by using the process black generated by superimposing the three colors, defects such as the blur of characters, a transfer failure, a fixation failure, ghost likely occur.

In general, transfer failure, fixation failure, degradation of color and color shading likely occur when the total amount of the toner (also called as "pile height") used for superimposing the respective colors CMY increases. In contrast, when the total amount of the toner reduces, the printed image is likely rubbed and the wobbling of characters becomes striking.

SUMMARY

According to an aspect of the invention, an image forming apparatus includes a classifying unit which classifies constituent elements constituting print data into a single or a plurality of areas based on a plurality of types of the constituent elements; a color conversion processing unit which performs, with respect to each of the constituent elements classified by the classifying unit, a color conversion coping with each type the constituent elements; and an image forming unit which composes the constituent elements subjected to the color conversion by the color conversion processing unit and forms an image based on the print data composed.

BRIEF DESCRIPTION OF THE DRAWINGS

Exemplary embodiments of the invention will be described in detail based on the following figures, wherein.

DETAILED DESCRIPTION

Hereinafter, an exemplary embodiment of an image forming apparatus and an image forming program according to the invention will be explained in detail with reference to the accompanying drawings.

Figure 1:
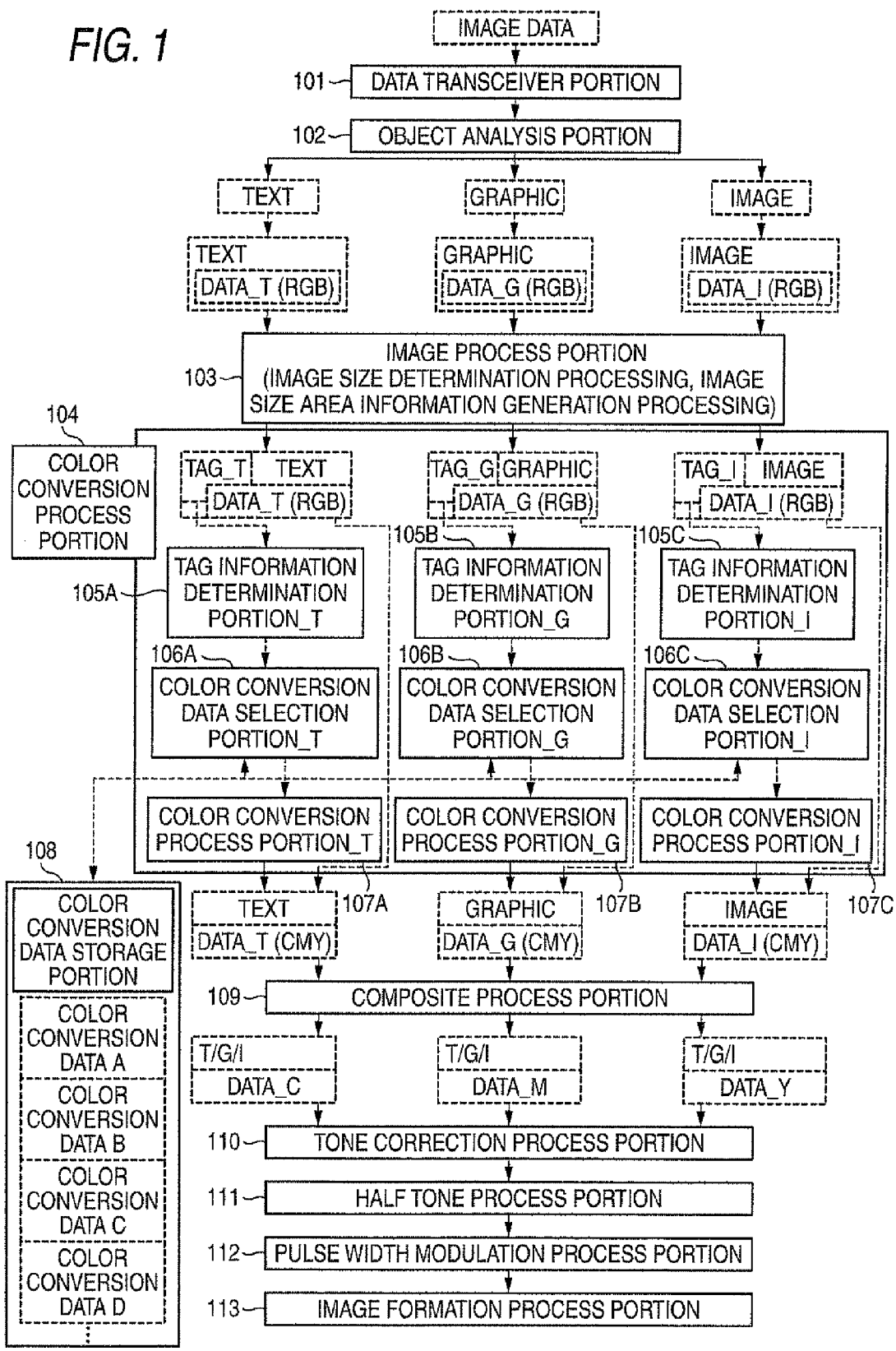
FIG. 1 is a diagram showing an example of the configuration of an image forming apparatus configured by applying the image forming apparatus and the image forming program according to the exemplary embodiment of the invention and also shows an example of a transition state in this configuration.

FIG. 1 is a diagram showing an example of the configuration of the image forming apparatus configured by applying the image forming apparatus and the image forming program according to the exemplary embodiment of the invention and also shows an example of a transition state in this configuration.

In FIG. 1, the image forming apparatus is configured by an electrophotographic printer, for example, and prints image data according to a print request on a print median by using print material (color material) of plural colors. The printer is arranged so as to cope with the multi-color printing and mounts therein a transfer mechanism for transferring respective color material of C (cyan), M (magenta) and Y (yellow) as an example, thereby to print out image data by using these color material.

Color material other than these color material is generated by mixing the respective color material with a predetermined ratio. For example, the color material "green" is generated by mixing cyan and yellow with a ratio of 1:1, whilst the color material of gray or black is generated by mixing all the color material of all the tree primary colors. The color material generated by mixing the plural color material in this manner is called a process color, and in particular, black generated from the process colors is called a process black.

The print output using the process colors is realized by the superimposed printing by mixing the three primary colors, that is, cyan, magenta and yellow (these color material is collectively called "CMY colors").

The image forming apparatus shown in FIG. 1 is configured by including a data transceiver portion 101, an object analysis portion 102, an image process portion 103, a color conversion process portion 104, a tag information determination portion 105, a color conversion data selection portion 106, a color conversion process portion 107, a color conversion data storage portion 108, a composite process portion 109, a tone correction process portion 110, a half tone process portion 111, a pulse width modulation process portion 112 and an image formation process portion 113.

Figure 3:
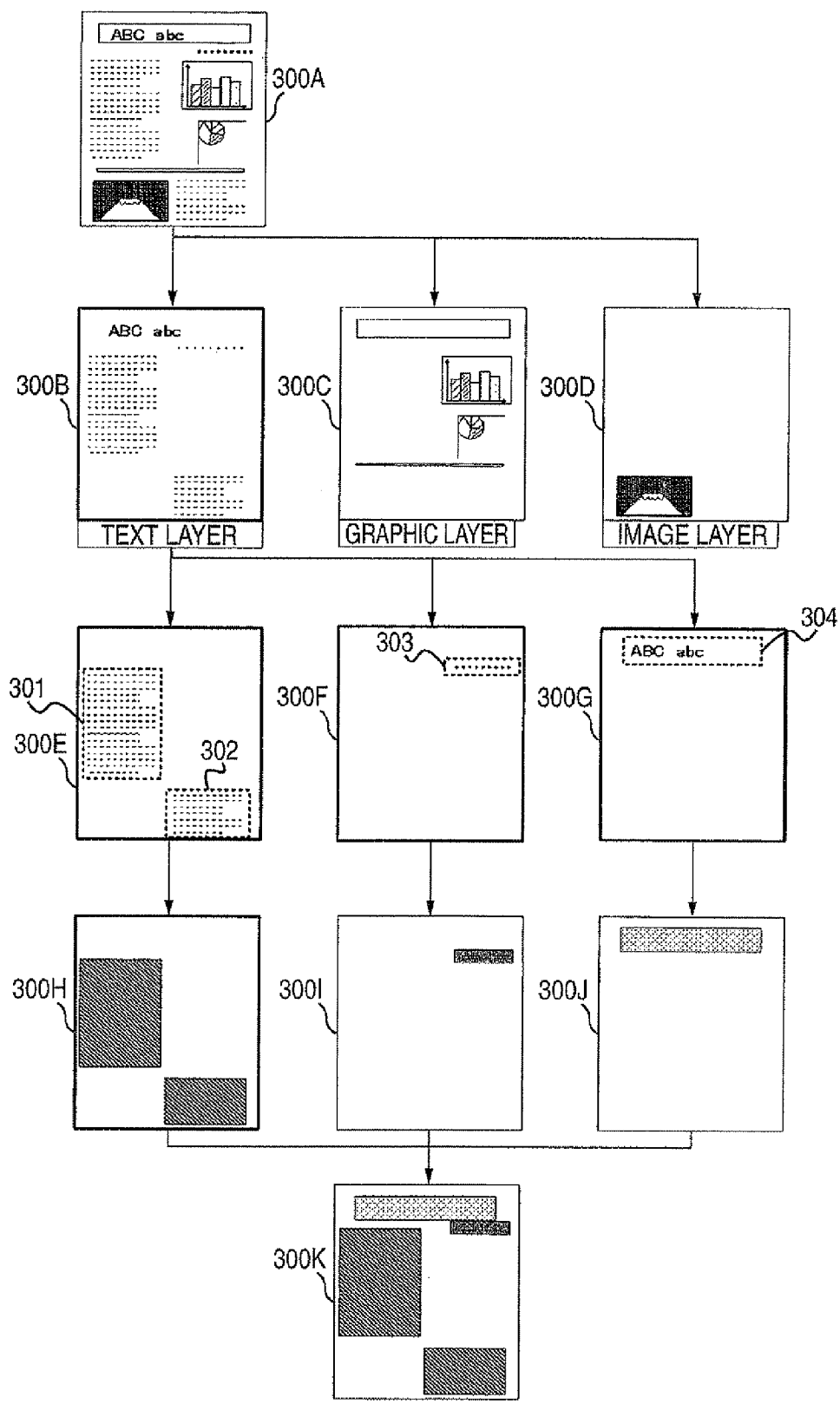
FIG. 3 is a diagram showing a concrete processing state of image data.

The data transceiver portion 101 receives image data represented by RGB (R: red, G: green, B: blue) in accordance with a print request issued from a client PC as a print requestor. An example of the image data is shown in FIG. 3. The image data shown in 300A is configured by characters or a text, graphics such as a figure or a graph and an image such as a picture.

The image data as shown in 300A received by the data transceiver portion 101 is transferred to the object analysis portion 102. The object analysis portion 102 analyzes the image data thus received to thereby separate the image data into respective image constituting elements (hereinafter also called "objects") constituting the image data.

The image constituting elements includes a text object, a graphic object (linear object) and an image object, for example. According to the separation processing of the object analysis portion 102, the image data is separated into the text objects of 300B, the graphic objects of 300C and the image objects of 300D.

The text objects, the graphic objects and the image objects are represented as Data_T (RGB), Data_G (RGB) and Data_I (ROB), respectively.

Succeedingly, the image process portion 103 performs a determining processing for determining the size (hereinafter also called "an object size") of each of the objects and a generation processing for generating area information for classifying the object sizes thus determined by the determining processing. As a determining subject for determining the object sizes by the determining processing, "a text size" is used in the case of the text object, "a line width" or "an image area of a graphic image" is used in the case of the graphic object, and "information using an image area and chroma of an image" is used in the case of the image object.

The image process portion 103 firstly determines the image sizes of the respective objects by using such the object sizes. When the object sizes of the respective objects are determined by the determining processing, the area information is generated based on the object sizes and the objects are respectively classified into the corresponding area information thus generated. Then, with respect to each of the objects, there is generated tag data formed by area information representing to which area the object is classified and positional information representing where the object is disposed on the image data.

The processings performed by the image process portion 103 will be explained with reference to FIG. 2.

Figure 2:
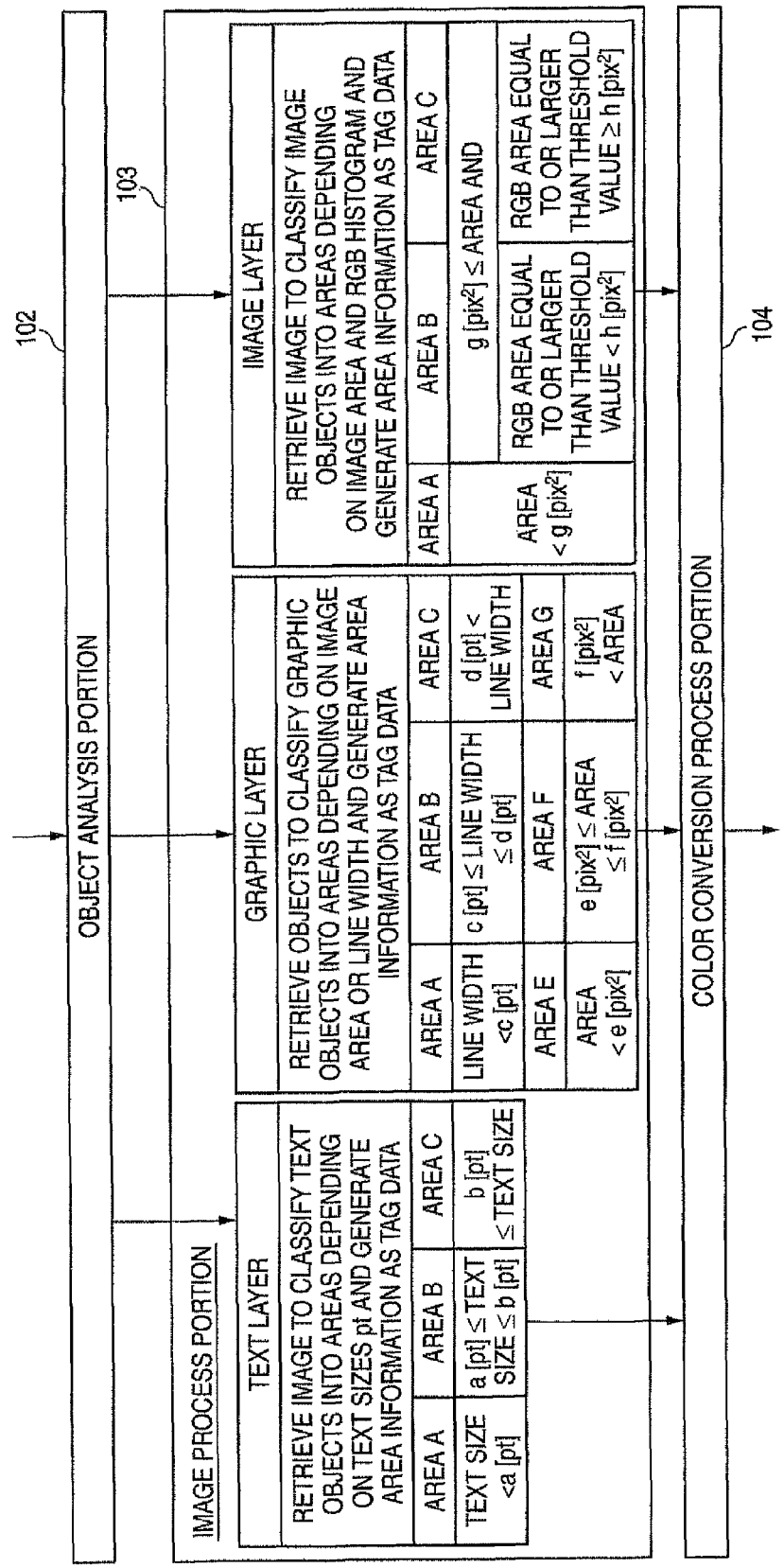
FIG. 2 is a detailed diagram showing an image process portion.

The image process portion 103 shown in FIG. 2 generates and classifies the areas based on the object sizes of the objects separated by the object analysis portion 102.

For example, as to the text objects in FIG. 2, there are generated an area A in the case where the text size is smaller than a predetermined value (a [pt]), an area B in the case where the text size is in a range between a [pt] or more and another predetermined value (b [pt]) or less, and an area C in the case where the text size is larger than b [pt]. Then, the text objects are classified into the respective areas.

FIG. 3 shows an example of the classification where a [pt] is set as 6[pt] and b [pt] is set as 32 [pt]. The text objects each having the text size or character size smaller than 6 [pt] and stored in the area A are shown in 300E, the text objects each having the text size in a range between 6 [pt] or more and 32 [pt] or less and stored in the area B are shown in 300F, and the text objects each having the text size larger than 32 [pt] and stored in the area C are shown in 300G.

That is, this figure shows that the area A stores two text object groups (301, 302) including the text objects each having the text size smaller than 6 [pt], the area B stores one text object group (303) including the text objects each having the text size in the range between 6 [pt] or more and 32 [pt] or less, and the area C stores one text object group (304) including the text objects each having the text size larger than 32 [pt].

Each of the text object groups shows a group of the text characters where the text objects having the text sizes classified into the same area are formed integrally and continuously.

Further, as to the graphic objects in FIG. 2, there are generated an area A in the case where the line width is smaller than a predetermined value (c [pt]), an area B in the case where the line width is in a range between c [pt] or more and another predetermined value (d [pt]) or less, and an area C in the case where the line width is larger than d [pt]. Then, the graphic objects are classified into the respective areas.

Furthermore, as to the graphic objects, there are generated an area E in the case where the area of a closed area of the graphic image is smaller than a predetermined value (e [pix·pix]), an area F in the case where the area is in a range between e [pix·pix] or more and another predetermined value (f [pix·pix]), and an area G in the case where the area is larger than f [pix·pix]. Then, the graphic objects also can be classified into these respective areas. In any case, the graphic objects are classified into the predetermined areas in accordance with the object sizes.

Further, as to the image objects in FIG. 2, there are generated an area A in the case where the area of an image is smaller than a predetermined value (g [pix·pix]), an area B in the case where the area is g [pix·pix] or more and the chroma of the image object is a predetermined threshold value (h [pix·pix]) or less, and an area C in the case where the area is g [pix·pix] or more and the chroma of the image object is larger than the predetermined threshold value (h [pix·pix]). Then, the image objects are classified into the respective areas.

The chroma of the image object is calculated by using the histogram of the RGB colors constituting the image data.

When the respective objects are classified into the corresponding areas in accordance with the object sizes thereof with respect to each of the object groups, there is generated the tag data formed by area discrimination information for discriminating the classified area and positional information representing the position on the image data. Four tag data in total is generated in the example of the text objects shown in 300E, 300F, and 300G.

300I, 300J, and 300K show the tag data generated from 300E, 300F, and 300G, respectively.

When the image process portion 103 generates the tag data for each of the object sizes of the respective objects, the tag data and the objects thus separated are transmitted to the color conversion process portion 104. The color conversion process portion 104 includes the tag information determination portions (105A, 105B, 105C), the color conversion data selection portions (106A, 106B, 106C) and the cooler conversion process portions (107A, 107B, 107C) for the respective objects, respectively.

First, the explanation will be made as to the processing performed by the color conversion process portion 104 with respect to the text objects.

The tag information determination portion 105A receives the tag data transmitted from the image process portion 103 and the color conversion process portion 107A receives the text objects transmitted therefrom.

The tag information determination portion 105A determines the area (the area A, the area B or the area C) to which the text object belongs by using the area discrimination information contained in the tag data thus received. Then, the tag information determination portion 105A transmits the area discrimination information thus determined to the color conversion data selection portion 106A.

The color conversion data selection portion 106A selects color conversion data from the color conversion data storage portion 108 based on the area discrimination information received from the tag information determination portion 105A. The color conversion data storage portion 108 stores color conversion data with respect to the area discrimination information of the respective objects. The color conversion data represents mixing ratios of color material for printing the respective objects. That is, the cooler conversion data storage portion stores the mixing ratios of the CMY colors for optimally printing the text objects classified into the respective areas.

For example, as to the color conversion data, a ratio for minimizing the blur and the wobbling of characters is set as the mixing ratio in the case of printing out the text objects belonging to the area A of the text objects. Further, a ratio for minimizing the degree of the transfer failure and the fixation failure is set as the mixing ratio in the case of printing out the text objects belonging to the area C of the text objects. The detailed explanation thereof will be made with reference to FIGS. 4 and 5.

When such the color conversion data is selected by the color conversion data selection portion 106A, the color conversion processing based on the color conversion data is requested against the potion 107A. The color conversion process portion 107A performs the processing for converting the colors formed by the three primary colors of the text objects received from the image process portion 103 into the print material of the CMY colors.

In FIG. 1, the text objects of the respective tag data shown by the CMY colors are represented as "Data_T(CMY)".

Next, the explanation will be made as to the processing performed by the color conversion process portion 104 with respect to the graphic objects.

The tag information determination portion 105B receives the tag data transmitted from the image process portion 103 and the color conversion process portion 107B receives the graphic objects transmitted therefrom.

The tag information determination portion 105B determines the area (the area A, the area B or the area C) to which the graphic object belongs by using the area discrimination information contained in the tag data thus received. Then, the tag information determination portion 105B transmits the area discrimination information thus determined to the color conversion data selection portion 106B.

The color conversion data selection portion 106B selects color conversion data from the color conversion data storage portion 108 based on the area discrimination information received from the tag information determination portion 105B. For example, as to the color conversion data, the color conversion data storage portion 108 sets a ratio for minimizing the blur and the wobbling of characters as the mixing ratio in the case of printing out the graphic objects belonging to the area A and the area E of the graphic objects. Further, a ratio for minimizing the degree of the transfer failure and the fixation failure is set as the mixing ratio in the case of printing out the graphic objects belonging to the area C and the area G of the graphic objects. The detailed explanation thereof will be made with reference to FIGS. 4 and 5.

When such the color conversion data is selected by the color conversion data selection portion 106B, the color conversion processing based on the color conversion data is requested against the potion 107B. The color conversion process portion 107B performs the processing for converting the colors formed by the three primary colors of the graphic objects received from the image process portion 103 into the print material of the CMY colors.

In FIG. 1 the graphic objects of the respective tag data shown by the CMY colors are represented as "Data_G(CMY)".

Next, the explanation will be made as to the processing performed by the color conversion process portion 104 with respect to the image objects.

The tag information determination portion 105C receives the tag data transmitted from the image process portion 103 and the color conversion process portion 107C receives the image objects transmitted therefrom.

The tag information determination portion 105C determines the area (the area A, the area B or the area C) to which the image object belongs by using the area discrimination information contained in the tag data thus received. Then, the tag information determination portion 105C transmits the area discrimination information thus determined to the color conversion data selection portion 106C.

The color conversion data selection portion 106C selects color conversion data from the color conversion data storage portion 108 based on the area discrimination information received from the tag information determination portion 105C. For example, as to the color conversion data, the color conversion data storage portion 108 sets a ratio for minimizing the blur and the wobbling of characters as the mixing ratio in the case of printing out the image objects belonging to the area A of the image objects. Further, a ratio for minimizing the degree of the transfer failure and the fixation failure is set as the mixing ratio in the case of printing out the image objects belonging to the area B and the area C of the image objects. The detailed explanation thereof will be made with reference to FIGS. 4 and 5.

When such the color conversion data is selected by the color conversion data selection portion 106B, the color conversion processing based on the color conversion data is requested against the potion 107B. The color conversion process portion 107B performs the processing for converting the colors formed by the three primary colors of the graphic objects received from the image process portion 103 into the print material of the CMY colors.

In FIG. 1, the image objects of the respective tag data shown by the CMY colors are represented as "Data_I(CMY)".

When the color conversion process portion 104 performs the color conversion processing in this manner with respect to the respective objects, "Data_T(CMY)", "Data_G(CMY)" and "Data_I(CMY)" obtained by the color conversion processing are transmitted to the composite process portion 109. The composite process portion 109 composes "Data_T(CMY)", "Data_G(CMY)" and "Data_I(CMY)" to thereby prepare data ("Data_C") for printing out data by using cyan, data ("Data_M") for printing out data by using magenta and data ("Data_Y") for printing out data by using yellow.

The respective data thus generated is transmitted to the tone correction process portion 110. The tone correction process portion 110 performs the tone correction as to each of the data ("Data_C", "Data_M" and "Data_Y") and transmits the respective data thus subjected to the tone correction to the half tone process portion 111. The half tone process portion 111 generates an intermediate color for each of the data thus received and transmits the intermediate colors to the pulse width modulation process portion 112. The pulse width modulation process portion 112 modulates the pulse width as to each of the intermediate colors thus received to reproduce the intermediate colors generated by the half tone process portion 111 and transmits the reproduced intermediate colors to the image formation process portion 113.

The image formation process portion 113 prints the data on a print medium such as a print sheet.

Figure 4:
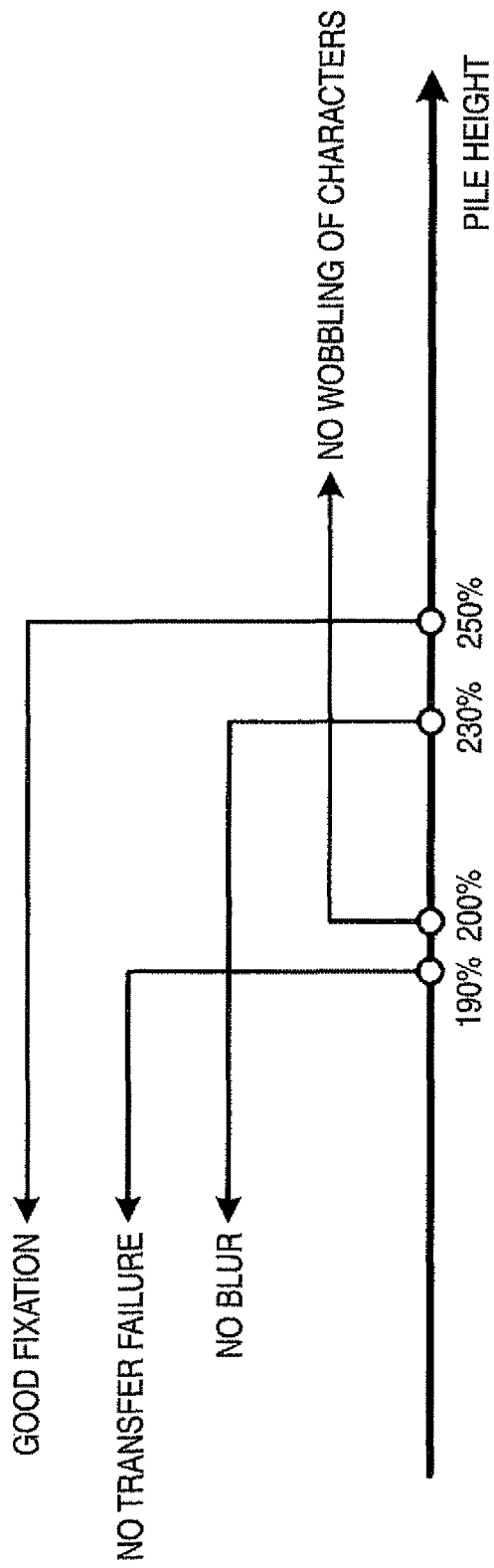
FIG. 4 is a diagram showing an image defect generation state with respect to a used amount of print material at the time of performing a superimposed printing using plural print material in an image formation process portion.

FIG. 4 is a diagram showing an image defect generation state with respect to a used amount of the print material at the time of performing the superimposed printing using plural print material in the image formation process portion 113.

FIG. 4 shows the used amount (pile height) of the print material in the abscissa, that is shows the used amount of the CMY colors in which "300%" represents a state where all of the CMY colors are superimposed equally and "100%" represents a state where one of the CMY colors is used. In other words, "190%" represents that the total pile height of the three colors of the CMY colors is 190%.

In the case where the pile height of the CMY colors is less than 190%, although the fixation failure, the transfer failure and the blur hardly occur, the wobbling of characters may occur. In the case where the pile height is in a range between 190% or more and less than 200%, although the fixation failure and the blur hardly occur, the transfer failure and the wobbling of characters may occur. In the case where the pile height is in a range between 200% or more and less than 230%, although the wobbling of characters, the blur and the fixation failure hardly occur, the transfer failure may occur. Further in the case where the pile height is in a range between 230% or more and less than 250%, although the wobbling of characters and the fixation failure hardly occur, the blur and the transfer failure may occur. Furthermore, in the case where the pile height is 250% or more, although the wobbling of characters hardly occurs, the blur, the transfer failure and the fixation failure may occur.

The optimum mixing ratios of the CMY colors at the time of printing the objects are registered with respect to the respective areas as the color conversion data based on FIG. 4 and held in the color conversion data storage portion 108 shown in FIG. 1.

For example, with respect to the objects belonging to the area A, each object has the text size smaller than a [pt] in the case of the text objects, each object has the line width smaller than c [pt] or the area of an image of the closed area smaller than e [pix·pix] in the case of the graphic objects, and each object has the area of an image smaller than g [pix·pix] in the case of the image objects. Thus, the color conversion data A determining the mixing ratios of the CMY colors is registered so as not to cause each of the crushing of small characters due to the blur or the wobbling of characters.

Figure 5A:
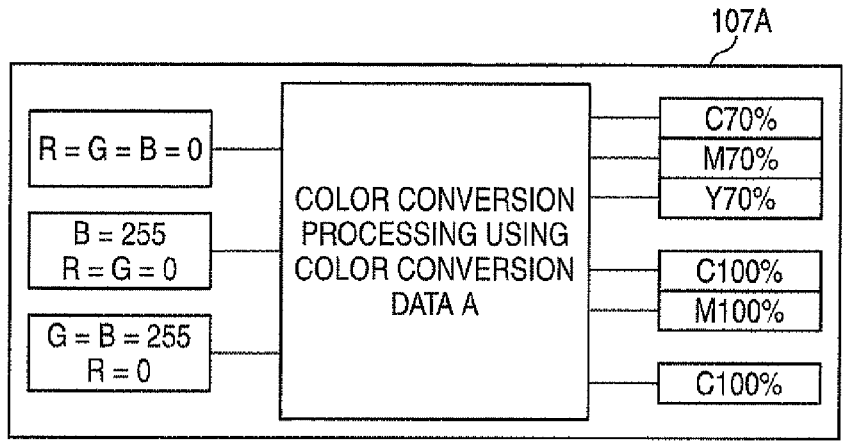
FIG. 5A is a diagram showing a concrete color conversion processing using the color conversion data A.

An example of the color conversion data A is shown in FIG. 5A. With respect to the color conversion data A shown in FIG. 5A, in the case where the luminance represented by 8 bits (0 to 255) of the RGB colors designated by image data requested for printing is same with respect to each color (R=G=B) and the luminance thereof is "0" (that is, "black"), the printing is performed by the color material of "210%" in total which is the mixture of "70%" of cyan, "70%" of magenta and "70%" of yellow as the CMY colors. Since the color material of "210%" in total locates within the range between 200% or more and less than 230% of FIG. 4, the wobbling of characters and the crushing of small characters due to the blur hardly occur.

With respect to the color conversion data A shown in FIG. 5A, in the case where the luminance represented by 8 bits of the RGB colors designated by image data requested for printing is "255" for B (blue) and "0" for each of G (green) and R (red), the printing is performed by the color material of "200%" in total which is the mixture of "100%" of cyan, "100%" of magenta and "0%" of yellow as the CMY colors. Since the color material of "200%" in total locates within the range between 200% or more and less than 230% of FIG. 4, the wobbling of characters and the crushing of small characters due to the blur hardly occur.

With respect to the color conversion data A shown in FIG. 5A, in the case where the luminance represented by 8 bits of the RGB colors designated by image data requested for printing is "255" for each of B (blue) and G (green) and "0" for R (red), the printing is performed by the color material of "100%" in total which is the mixture of "100%" of cyan, "0%" of magenta and "0%" of yellow as the CMY colors. Although the color material of "100%" in total locates within the range less than 190% of FIG. 4, since the color material contains only cyan, the superimposed printing by mixing plural color material is not performed, so that it is not necessary to take the error in the case of the superimposed printing into consideration.

Succeedingly, as another example, with respect to the objects belonging to the area C, each object has the text size larger than b [pt] in the case of the text objects, each object has the line width larger than d [pt] or the area of an image of the closed area larger than f [pix·pix] in the case of the graphic objects, and each object has the area of an image equal to or larger than g [pix·pix] and the threshold value in the RGB histogram equal to or larger than h [pix·pix] in the case of the image objects. Thus, the color conversion data C determining the mixing ratios of the CMY colors is registered so as not to cause each of the transfer failure and the fixation failure.

Figure 5B:
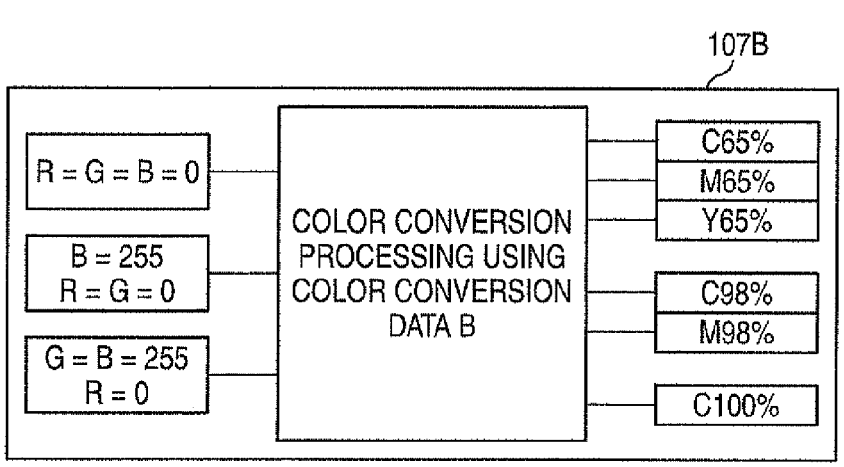
FIG. 5B is a diagram showing a concrete color conversion processing using the color conversion data B.
Figure 5C:
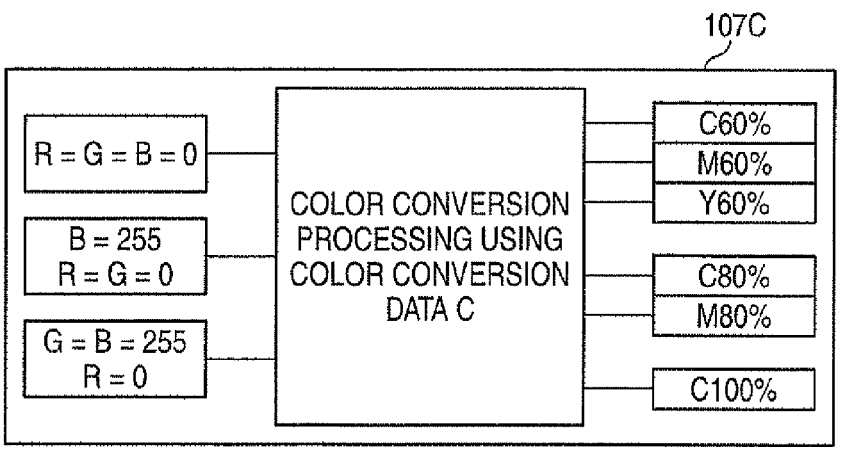
FIG. 5C is a diagram showing a concrete color conversion processing using the color conversion data B.

An example of the color conversion data C is shown in FIG. 5C. With respect to the color conversion data C shown in FIG. 5C, in the case where the luminance represented by 8 bits (0 to 255) of the RGB colors designated by image data requested for printing is same with respect to each color (R=G=B) and the luminance thereof is "0" (that is, "black"), the printing is performed by the color material of "180%" in total which is the mixture of "60%" of cyan, "60%" of magenta and "60%" of yellow as the CMY colors. Since the color material of "180%" in total locates within the range less than 190% of FIG. 4, the blur, the transfer failure and the fixation failure hardly occur.

With respect to the color conversion data C shown in FIG. 5C, in the case where the luminance represented by 8 bits of the RGB colors designated by image data requested for printing is "255" for B (blue) and "0" for each of G (green) and R (red), the printing is performed by the color material of "160%" in total which is the mixture of "80%" of cyan, 80%" of magenta and "0%" of yellow as the CMY colors. Since the color material of "160%" in total locates within the range less than 190% of FIG. 4, like the aforesaid case, the blur, the transfer failure and the fixation failure hardly occur.

With respect to the color conversion data C shown in FIG. 5C, in the case where the luminance represented by 8 bits of the ROB colors designated by image data requested for printing is "255" for each of B (blue) and G (green) and "0" for R (red), the printing is performed by the color material of "100%" in total which is the mixture of "100%" of cyan, "0%" of magenta and "0%" of yellow as the CMY colors. Although the color material of "100%" in total locates within the range less than 190% of FIG. 4, since the color material contains only cyan, the superimposed printing by mixing plural color material is not performed, so that it is not necessary to take the error in the case of the superimposed printing into consideration.

Further, as another example, with respect to the objects belonging to the area B, each object has the text size in a range between a [pt] or more and b [pt] or less in the case of the text objects, each object has the line width in a range between c

[pt] or more and d [pt] or less or the area of an image of the closed area in a range between e [pix·pix] or more and f [pix·pix] or less in the case of the graphic objects, and each object has the area of an image equal to or larger than g [pix·pix] and the threshold value in the RGB histogram smaller than h [pix·pix] in the case of the image objects. Thus, the color conversion data B determining the mixing ratios of the CMY colors is registered so as not to cause each of the fixation failure, the wobbling of characters and the blur to a large extent.

An example of the color conversion data B is shown in FIG. 5B. With respect to the color conversion data B shown in FIG. 5B, in the case where the luminance represented by 8 bits (0 to 255) of the RGB colors designated by image data requested for printing is same with respect to each color (R=G=B) and the luminance thereof is "0" (that is, "black"), the printing is performed by the color material of "195%" in total which is the mixture of "65%" of cyan, "65%" of magenta and "65%" of yellow as the CMY colors. Since the color material of "195%" in total locates within the range between 190% or more and less than 200% of FIG. 4, the blur and the fixation failure hardly occur and the occurrence of the transfer failure and the wobbling of characters is suppressed to the minimum degree With respect to the color conversion data B shown in FIG. 5B, in the case where the luminance represented by 8 bits of the RGB colors designated by image data requested for printing is "255" for B (blue) and "0" for each of G (green) and R (red), the printing is performed by the color material of "196%" in total which is the mixture of "98%" of cyan, "98%" of magenta and "0%" of yellow as the CMY colors. Since the color material of "196%" in total locates within the range between 190% or more and less than 200% of FIG. 4, the blur and the fixation failure hardly occur and the occurrence of the transfer failure and the wobbling of characters is suppressed to the minimum degree Further, with respect to the color conversion data B shown in FIG. 5B, in the case where the luminance represented by 8 bits of the RGB colors designated by image data requested for printing is "255" for each of B (blue) and G (green) and "0" for R (red), the printing is performed by the color material of "100%" in total which is the mixture of "100%" of cyan, "0%" of magenta and "0%" of yellow as the CMY colors. Although the color material of "100%" in total locates within the range less than 190% of FIG. 4, since the color material contains only cyan, the superimposed printing by mixing plural color material is not performed, so that it is not necessary to take the error in the case of the superimposed printing into consideration.

Figure 6:
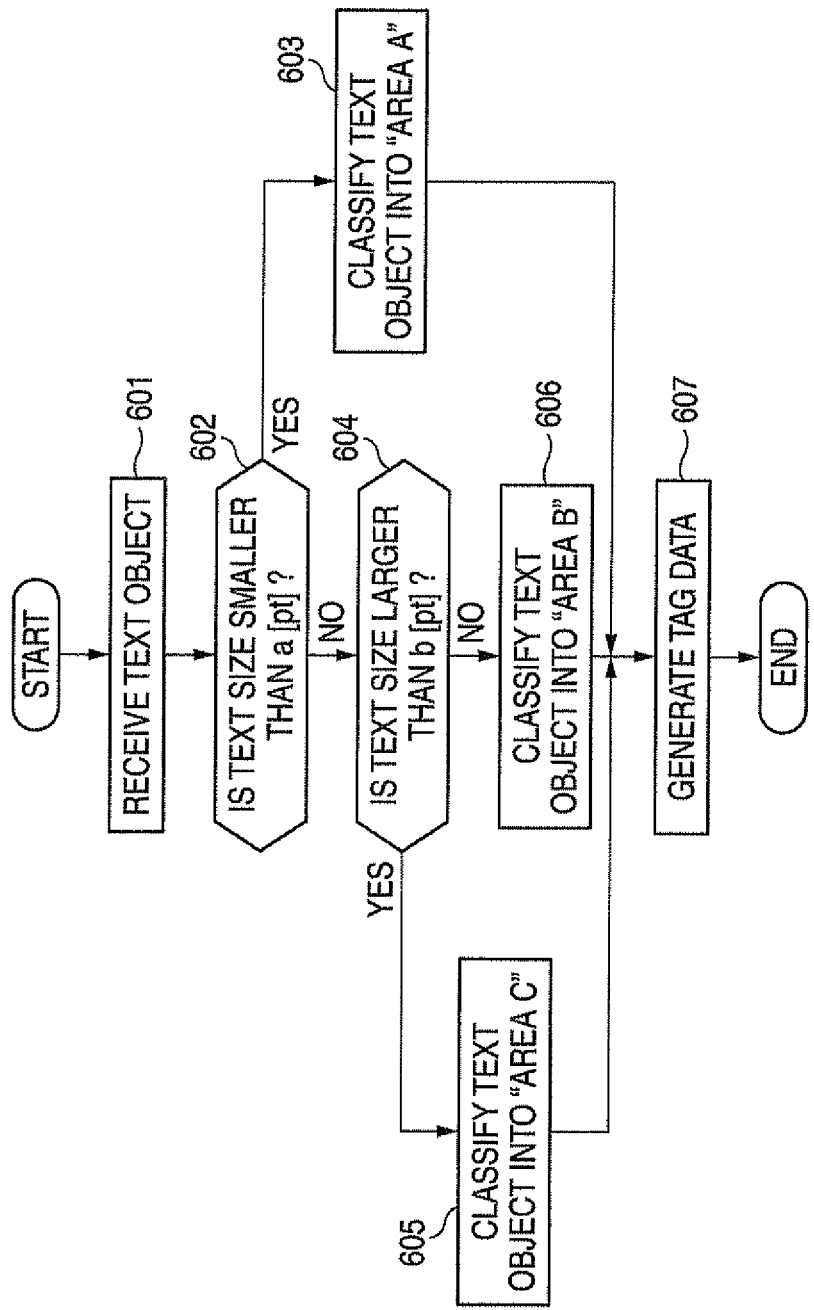
FIG. 6 is a flowchart showing a processing performed with respect to text objects by the image process portion shown in FIGS. 1 and 2.

FIG. 6 is a flowchart showing the processing performed with respect to the text objects by the image process portion shown in FIGS. 1 and 2.

In FIG. 6, when the image process portion receives the text objects separated by the object analysis portion (601), the processing is started. Firstly, it is determined whether or not the text size of the received text object is smaller than a [pt] (602). When the text size of the received text object is smaller than a [pt], this text object is classified into the "area A" (603).

In contrast, when the text size of the received text object is not smaller than a [pt] (No in 602), succeedingly it is determined whether or not the text size is larger than b [pt] (604). In this respect, it is supposed that a is smaller than b. When the text size of the text object is larger than b [pt] (Yes in 604), this text object is classified into the "area C" (605).

When the text size of the text object is in a range between a [pt] or more and b [pt] or less, this text object is classified into the "area B" (606).

The tag data is generated as to each of the respective text objects classified in this manner (607).

Figure 7:
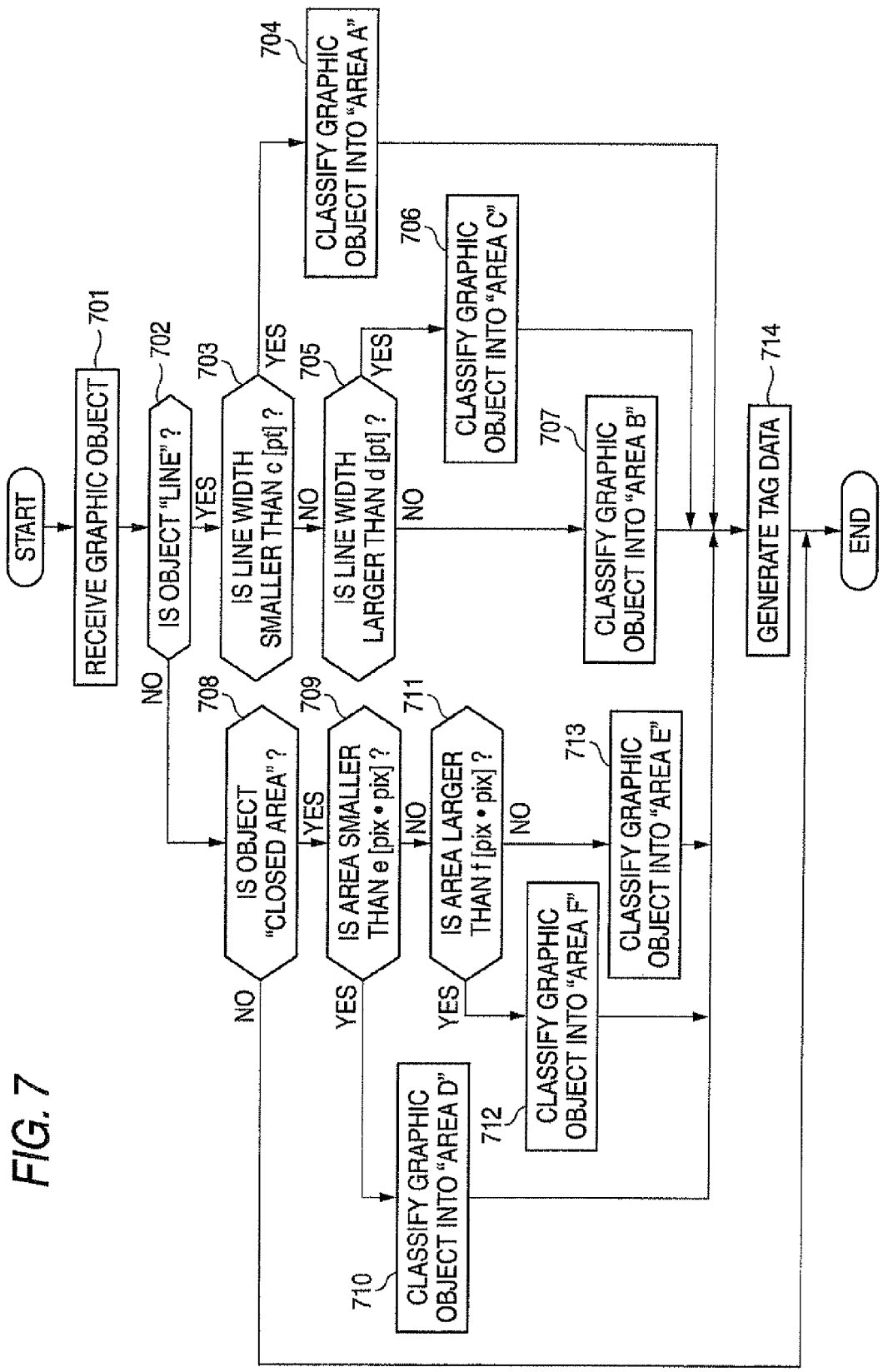
FIG. 7 is a flowchart showing a processing performed with respect to graphic objects by the image process portion shown in FIGS. 1 and 2.

FIG. 7 is a flowchart showing the processing performed with respect to the graphic objects by the image process portion shown in FIGS. 1 and 2.

In FIG. 7, when the image process portion receives the graphic objects separated by the object analysis portion (701), the processing is started. Firstly, it is determined whether or not the received graphic object is a "line" (702). When the graphic object is a "line" (Yes in 702), succeedingly it is determined whether or not the line width is smaller than c [pt] (703). When the line width of the received graphic object is smaller than c [pt] (Yes in 703), this graphic object is classified into the "area A" (704).

In contrast, when the line width of the graphic object is not smaller than c [pt] (No in 703), succeedingly it is determined whether or not the line width is larger than d [pt] (705), in this respect, it is supposed that c is smaller than d. When the line width of the graphic object is larger than d [pt] (Yes in 705), this graphic object is classified into the "area C" (706).

In contrast, when the line width of the graphic object is in a range between c [pt] or more and d [pt] or less, this graphic object is classified into the "area B" (707).

In contrast, when the graphic object is not a "line" (No in 702), succeedingly it is determined whether or not the graphic object is a "closed area" (708). When this object is not a closed area (No in 708), the processing of this flowchart is terminated.

When this object is a closed area (Yes in 708), succeedingly it is determined whether or not the image area of the closed area is smaller than e [pix·pix] (709). When the image area of the closed area is smaller than e [pix·pix] (Yes in 709), this graphic object is classified into the "area D" (707). When the image area of the closed area is not smaller than e [pix·pix] (No in 709), succeedingly it is determined whether or not the image area is larger than f [pix·pix] (711). In this respect, it is supposed that e is smaller than f.

When the image area is larger than f [pix·pix] (Yes in 711), this graphic object is classified into the "area F" (712). When the image area is in a range between e [pix·pix] or more and f [pix·pix] or less (No in 711), this graphic object is classified into the "area E" (713).

The tag data is generated as to each of the respective graphic objects classified in this manner (714).

Figure 8:
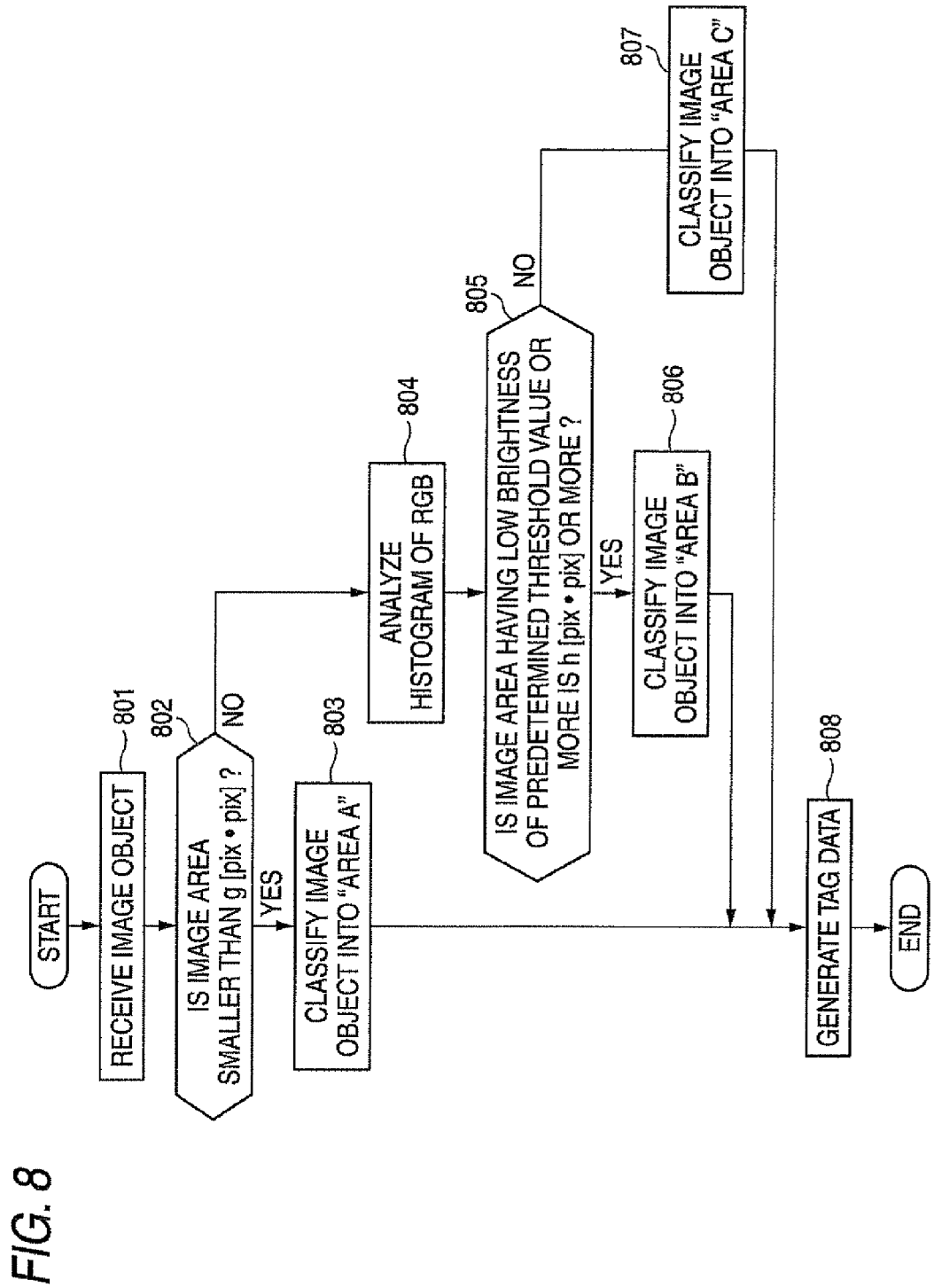
FIG. 8 is a flowchart showing a processing performed with respect to image objects by the image process portion shown in FIGS. 1 and 2.

FIG. 8 is a flowchart showing the processing performed with respect to the image objects by the image process portion shown in FIGS. 1 and 2.

In FIG. 8, when the image process portion receives the image objects separated by the object analysis portion (801), the processing is started. Firstly, it is determined whether or not the image area of the received image object is smaller than g [pix·pix] (802). When the image area of the image object is smaller than g [pix·pix] (Yes in 802), this image object is classified into the "area A" (803).

In contrast, when the image area of the image object is not smaller than g [pix·pix] (No in 802), the histogram of the RGB colors of the received image data is analyzed to determine whether or not the image area having the low brightness of the predetermined threshold value or more is h [pix·pix] or more (805). When the image area is h [pix·pix] or more (Yes in 805), this image object is classified into the "area B" (806).

In contrast, when the image area is not h [pix·pix] or more (No in 805), this image object is classified into the "area C" (807).

The tag data is generated as to each of the respective image objects classified in this manner (808).

The invention is not limited to the aforesaid exemplary embodiment described above and shown in the drawings and can be implemented by suitably being modified within a range not changing the gist thereof.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image forming apparatus, comprising:
    an analysis unit that analyzes and separates print data into a plurality of constituent elements including text objects, graphic objects and image objects constituting the print data;
    a classifying unit which classifies each of the text objects, graphic objects and image objects constituting the print data into a single or a plurality of areas based on the text objects having a text size being above or below at least one text size threshold, the graphics objects having a line width or area being above or below at least one graphics line width threshold or graphics area threshold, and the image objects having an area being above or below at least image area threshold, the classifying unit further classifying the image objects having an area above the image area threshold based on whether the image objects have a chroma value above or below a chroma value threshold;
    a tag generation unit which generates a tag for each of the text objects, graphic objects and image objects classified by the classifying unit, the tag data including area information indicative of which area the text objects, graphic objects and image objects are classified into and including positional information indicative of a position within the image where the corresponding classified text objects, graphic objects and image objects are disposed;
    a color conversion processing unit which performs, with respect to each of the constituent elements classified by the classifying unit, a color conversion based on the areas into which the text objects, the graphics objects and the image objects are classified; and
    an image forming unit which composes the constituent elements subjected to the color conversion by the color conversion processing unit and forms an image based on print data composed.

2. The image forming apparatus according to claim 1, wherein a first type of the first constituent is a size of the character, and
    wherein the color conversion processing unit performs the color conversion in a manner of restricting a total amount of color material of each color in accordance with the size of the character.

3. The image forming apparatus according to claim 1, wherein a second constituent elements is a line drawing, and a second type of the second constituent element is at least one of a line width of the line drawing and a closed area constituted by the line drawing, and
    the color conversion processing unit performs the color conversion in a manner of restricting a total amount of color material of each color in accordance with one of the line width of the line drawing and the closed area.

4. The image forming apparatus according to claim 1, wherein a third constituent elements is an image, and a third type of the constituent elements is a color distribution of the image, and
    wherein the color conversion processing unit performs the color conversion in accordance with the color distribution of the image.

5. The image forming apparatus according to claim 1, wherein the color conversion processing unit includes:
    a color conversion information management unit which manages color conversion information in corresponding to the plurality of types of the constituent elements; and
    a selection unit which selects the color conversion information corresponding to the plurality of types of the constituent element from the color conversion information managed by the color conversion information management unit,
    wherein each of the constituent elements is subjected to the color conversion based on the color conversion information selected by the selection unit.

6. The image forming apparatus according to claim 1, further comprising:
    a generation unit which generates constituent element information including first information relating to a position of the constituent elements classified by the classifying unit, second information relating to each type of the constituent elements and third information relating to the position of the constituent elements,
    wherein each of the constituent elements is subjected to the color conversion with reference to the constituent element information generated by the generation unit.

7. An image forming apparatus, comprising:
    an analysis unit that analyzes and separates print data into a plurality of constituent elements including text objects, graphic objects and image objects constituting the print data;
    a separation unit which separates the print data into one of the plurality of constituent elements in accordance with a type of the print data;
    a classifying unit which classifies each of the text objects, graphic objects and image objects constituting the print data into a single or a plurality of areas based on the text objects having a text size being above or below at least one text size threshold, the graphics objects having a line width or area being above or below at least one graphics line width threshold or graphics area threshold, and the image objects having an area being above or below at least image area threshold, the classifying unit further classifying the image objects having an area above the image area threshold based on whether the image objects have a chroma value above or below a chroma value threshold;
    a tag generation unit which generates a tag for each of the text objects, graphic objects and image objects classified by the classifying unit, the tag data including area information indicative of which area the text objects, graphic objects and image objects are classified into and including positional information indicative of a position within the image where the corresponding classified text objects, graphic objects and image objects are disposed;
    a color conversion processing unit which performs, with respect to each of the constituent elements classified by the classifying unit, a color conversion based on the areas into which the text objects, the graphics objects and the image objects are classified; and an image forming unit which composes the constituent elements subjected to the color conversion by the color conversion processing unit and forms an image based on print data composed.

8. A non-transitory computer readable medium storing a program causing a computer to execute a process for forming an image, the process comprising:

an analysis unit that analyzes and separates print data into a plurality of constituent elements including text objects, graphic objects and image objects constituting the print data;

a separation unit which separates the print data into a single one of the plurality of constituent elements in accordance with a type of the print data;

a classifying unit which classifies each of the text objects, graphic objects and image objects constituting the print data into a single or a plurality of areas based on the text objects having a text size being above or below at least one text size threshold, the graphics objects having a line width or area being above or below at least one graphics line width threshold or graphics area threshold, and the image objects having an area being above or below at least image area threshold, the classifying unit further classifying the image objects having an area above the image area threshold based on whether the image objects have a chroma value above or below a chroma value threshold;

a tag generation unit which generates a tag for each of the text objects, graphic objects and image objects classified by the classifying unit, the tag data including area information indicative of which area the text objects, graphic objects and image objects are classified into and including positional information indicative of a position within the image where the corresponding classified text objects, graphic objects and image objects are disposed;

a color conversion processing unit which performs, with respect to each of the constituent elements classified by the classifying unit, a color conversion based on the areas into which the text objects, the graphics objects and the image objects are classified; and an image forming unit which composes the constituent elements subjected to the color conversion by the color conversion processing unit and forms an image based on print data composed.

9. The image forming apparatus according to claim 1, wherein the color conversion processing unit performs the color conversion so as not to cause each of crushing of small characters due to blur or wobbling of the characters.

* * * * *